United States Patent
Green

(10) Patent No.: US 8,988,185 B2
(45) Date of Patent: Mar. 24, 2015

(54) SECURITY DOCUMENT, SECURITY SYSTEMS AND METHODS OF CONTROLLING ACCESS TO A REGION

(75) Inventor: Stephen Banister Green, Southampton (GB)

(73) Assignee: De la Rue International Limited, Hampshire (GB)

( * ) Notice: Subject to any disclaimer, the term of this patent is extended or adjusted under 35 U.S.C. 154(b) by 992 days.

(21) Appl. No.: 12/994,809

(22) PCT Filed: Apr. 29, 2009

(86) PCT No.: PCT/GB2009/001093
§ 371 (c)(1),
(2), (4) Date: Feb. 8, 2011

(87) PCT Pub. No.: WO2009/150394
PCT Pub. Date: Dec. 17, 2009

(65) Prior Publication Data
US 2011/0156864 A1    Jun. 30, 2011

(30) Foreign Application Priority Data

Jun. 12, 2008 (GB) .................................. 0810807.8
Oct. 6, 2008 (GB) .................................. 0818272.7

(51) Int. Cl.
*G06K 7/04* (2006.01)
*G06K 19/07* (2006.01)
(Continued)

(52) U.S. Cl.
CPC .......... *G06K 19/0723* (2013.01); *G06K 19/025* (2013.01); *G06K 19/072* (2013.01); *G06K 19/0724* (2013.01); *G06K 19/07749* (2013.01); *G06K 19/07767* (2013.01)
USPC .......................................... 340/5.2; 340/10.1

(58) Field of Classification Search
USPC ................................ 340/5.2, 5.86, 10.1, 4.61
See application file for complete search history.

(56) References Cited

U.S. PATENT DOCUMENTS 5,995,006 A * 11/1999 Walsh ......................... 340/572.7
6,774,865 B1    8/2004 Serra
(Continued)

FOREIGN PATENT DOCUMENTS

| DE | 10 2005 062 827 A1 | 6/2007 |
|----|---|---|
| WO | WO 02/11061 A1 | 2/2002 |
| WO | WO 02/054784 M | 7/2002 |

OTHER PUBLICATIONS

International Search Report dated Feb. 5, 2010 in corresponding International Application No. PCT/GB2009/001093.
(Continued)

*Primary Examiner* — Edwin Holloway, III
(74) *Attorney, Agent, or Firm* — Oliff PLC

(57) ABSTRACT

A security document is provided comprising a first RFID tag readable only within a first range, and a second RFID tag readable within a second range, the first RFID tag containing data pertaining to the owner of the security document and an identification code, and the second RFID tag containing the same or a related identification code, and wherein the second range is longer than the first range. Also provided is a method and system for controlling access to a region, each person seeking access carrying a detectable unique identifier. The method comprises: detecting, at a first location, a unique identifier relating to a person in the first location; using the detected unique identifier to retrieve information concerning the person from one or more external databases; supplying the retrieved information to a second location remote from the first location; and using, at the second location, the retrieved information to make a decision as to whether to allow the person carrying the unique identifier access to the controlled region.

27 Claims, 5 Drawing Sheets

(51) Int. Cl.
*G06K 19/02* (2006.01)
*G06K 19/077* (2006.01)

(56) References Cited

U.S. PATENT DOCUMENTS

| | | | |
|---|---|---|---|
| 7,446,646 B2 * | 11/2008 | Huomo | 340/10.1 |
| 2002/0044096 A1 | 4/2002 | Chung | |
| 2002/0143588 A1 * | 10/2002 | Ishigami et al. | 705/5 |
| 2003/0173408 A1 | 9/2003 | Mosher, Jr. et al. | |
| 2004/0233042 A1 | 11/2004 | Piccoli et al. | |
| 2005/0218215 A1 | 10/2005 | Lauden | |
| 2007/0159338 A1 | 7/2007 | Beber et al. | |
| 2007/0164866 A1 | 7/2007 | Robin et al. | |
| 2007/0252001 A1 | 11/2007 | Kail et al. | |
| 2008/0072423 A1 * | 3/2008 | Finn | 29/854 |
| 2008/0290994 A1 * | 11/2008 | Bruns et al. | 340/10.1 |
| 2008/0319905 A1 * | 12/2008 | Carlson | 705/44 |

OTHER PUBLICATIONS

Written Opinion of the International Searching Authority dated Feb. 5, 2010 in corresponding International Application No. PCT/GB2009/001093.

International Preliminary Report on Patentability dated Oct. 21, 2010 in corresponding International Application No. PCT/GB2009/001093.

* cited by examiner

SECURITY DOCUMENT, SECURITY SYSTEMS AND METHODS OF CONTROLLING ACCESS TO A REGION

This invention relates to security documents and systems, in particular passports and identification cards, but could be applied to any document type, and methods for controlling access to a region, in particular, immigration methods.

It is known to improve the security of a document by incorporating a contactless data store in the document, in the form of an RFID tag. Typically, the RFID tag is programmed at the time of manufacturing the document with data relating to the document's owner. This not only makes the document more difficult to forge or modify, but also enhances checking of the document's validity since this may be automated to some extent.

Conventionally, RFID tags incorporated in passports are High Frequency (HF) RFID tags, operating at a frequency of 13.56 MHz. HF RFID tags are preferred since they can store a reasonable volume of data and can only be read within a short distance. Preferably, this distance is less than 1 metre, but if desired could be up to 1.5 metres or, if a high power reader is used, a maximum of around 3 meters. This restricts the region within which the RFID tag can be interrogated, and so safeguards the data saved on the chip to preserve user privacy. To further protect the data on the chip, the document may include an electromagnetic shield such as a layer of metal mesh, which prevents the chip being read until (for example) the passport book is opened.

It is desirable to enhance security of such documents wherever possible in order to increase the difficulty of counterfeiting the document and to improve detection of such counterfeits. It is further desirable to expedite checking of such documents.

In accordance with a first aspect of the present invention, a security document comprises a first RFID tag readable only within a first range, and a second RFID tag readable within a second range, the first RFID tag containing data pertaining to the owner of the security document and an identification code, and the second RFID tag containing the same or a related identification code, and wherein the second range is longer than the first range.

By providing the document with two RFID tags with inter-related codes in this way, security is enhanced since removal or substitution of either tag would be readily detected. Further, the use of the longer-range RFID tag does not compromise user privacy since it holds an identification code rather than any personal data. The identification codes held by the first and second RFID tags may be identical or may instead be related to one another, e.g. via a database correlating each first RFID tag identification code to a certain second RFID tag identification code. Alternatively, one or other of the identification codes could include all or part of the other code.

Preferably, the first range comprises a maximum reading distance of between zero and about 3 metres from the first RFID tag, preferably between zero and about 1 metre from the first RFID tag. The first RFID tag is not readable from outside the maximum reading distance, but is readable from anywhere within the maximum reading distance (i.e. between the first RFID tag and the maximum reading distance).

Advantageously, the second range comprises a maximum reading distance of over about 1 metre from the second RFID tag, preferably over about 3 meters from the second RFID tag, still preferably over about 10 metres from the second RFID tag. As previously indicated, the maximum reading distance of the second RFID tag is greater than that of the first. The second RFID tag is readable from anywhere within its maximum reading distance.

In a preferred embodiment, the identification code identifies the second RFID tag, and the same identification code is programmed into the first RFID tag. Alternatively, the identification code identifies the first RFID tag, and the same identification code is programmed into the second RFID tag.

Preferably, the data contained on the first RFID tag includes personal data relating to the owner (e.g. biographical data) and/or biometric data relating to the owner, preferably fingerprint data, iris templates and/or face recognition data.

Advantageously, the first RFID tag comprises a High Frequency (HF) RFID chip, and the second RFID tag comprises an Ultra High Frequency (UHF) RFID chip. In certain embodiments, the HF RFID chip operates at a frequency in the range 3 MHz to 29 MHz, preferably 13 MHz to 14 MHz, still preferably approximately 13.56 MHz. Advantageously, the UHF RFID chip operates at a frequency in the range 433 to 950 MHz, preferably 860 to 870 MHz.

In some preferred embodiments, the first and second RFID tags are integrally formed on a single chip.

Preferably, the second RFID tag contains no data pertaining to the document's owner.

Passive RFID tags, rather than active, are preferred for use in the present invention. Passive RFID tags rely entirely on the reader as their power source, and do not require the provision of a battery or similar. Passive UHF RFID tags can typically be read up to 10 m away, and they have lower production costs than active or semi-passive RFID tags.

However, active and semi-passive RFID tags are also suitable for the present invention. Active and semi-passive RFID tags use internal batteries to power their circuits. An active tag also uses its battery to broadcast radio waves to a reader, whereas a semi-passive tag relies on the reader to supply its power for broadcasting. Because these tags contain more hardware than passive RFID tags, they are more expensive. UHF RFID active and semi-passive tags are generally reserved for applications that require the document to be read over greater distances and they typically broadcast high frequencies from 850 to 950 MHz that can be read 30 m or more away.

The first aspect of the invention further provides a security system comprising a plurality of security documents, each as described above, the identification code of each security document being unique to that security document, a first reader adapted to read data from the first RFID tags, a second reader adapted to read data from the second RFID tags, a database having data records containing details of each security document owner and the corresponding identification code, and a processor adapted to, upon recognition of an identification code by the first or second reader, retrieve the corresponding record from the database.

The first and second readers may in practice be combined into a single unit configurable to read each of the first and second RFID tags.

Preferably, the processor is further linked to at least one external database and is further adapted to retrieve records corresponding to the identified security document owner from the at least one external database.

According to a second aspect of the invention, a biometric checking system is provided, comprising a RFID tag reader for reading data from a security document having at least one RFID tag, each RFID tag containing an identification code identifying the security document, at least one biometric input module for testing a biometric of a holder of the security document, a database having data records containing details of each security document owner and the corresponding identification code, and a processor adapted to, upon recognition of an identification code, retrieve the corresponding data record and compare the output from the biometric testing module with biometric data in the retrieved data record to ascertain whether the holder of the security card matches the data records for the security document owner.

By retrieving the document owner's profile, the system can carry out a one-to-one comparison of the biometric input with the stored data for that user, to determine whether there is a match. This requires significantly less processing capacity than comparing the biometric input against all data records to identify the holder (i.e. carrying out a one-to-N comparison), and so accelerates the checking process.

Preferably, the RFID tag reader is adapted to read the RFID tag from a distance of over about 1 metre from the RFID tag, preferably over about 3 meters from the RFID tag, still preferably over about 10 metres from the RFID tag. Advantageously, the RFID tag reader is an Ultra High Frequency (UHF) RFID tag reader, and each RFID tag is a UHF RFID tag.

Preferably, the biometric input module(s) is/are adapted to scan the holder's iris pattern and/or fingerprint(s), and/or perform facial recognition.

In a preferred embodiment, the RFID tag reader is located remotely from the biometric input module(s). This can enable the owner's profile to be retrieved before the holder arrives at the biometric input module. Advantageously, the RFID tag reader is located at an entrance to a checking area containing the biometric input module(s).

One problem that is faced by many immigration systems is that of how to improve the speed of verifying each passenger and, ultimately, improve passenger throughput. For example, it is common to experience long queues at airports, shipping ports and the like while each person's passport or other security document is examined and checked against records.

In accordance with a third aspect of the present invention, a method of controlling access to a region is provided, each person seeking access carrying a detectable unique identifier, the method comprising:
  detecting, at a first location, a unique identifier relating to a person in the first location;
  using the detected unique identifier to retrieve information concerning the person from one or more external databases;
  supplying the retrieved information to a second location remote from the first location; and
  using, at the second location, the retrieved information to make a decision as to whether to allow the person carrying the unique identifier access to the controlled region.

By detecting a unique identifier, such as a passport number or chip number etc, at a first location and using this to retrieve information such as the document owner's profile from external databases (i.e. databases generally maintained separately to the immigration system), details of each owner (i.e. the person to which the unique identifier corresponds) can be obtained without the holder needing to present the security document to an inspector. A decision can then be made (e.g. whether or not to permit the holder entry) at a second location without needing to stop the holder for a long period whilst records are checked, thus permitting far greater throughput. This can be used for example in airports or other transport terminals, or at borders between countries.

The first location is advantageously positioned to cover an area through which all persons wishing to enter the controlled region must pass (e.g. those persons entering the airport from an aeroplane). The second location is spaced some way from the first along the path followed by the persons. For example, the second location may be positioned just before or just after the baggage hall in an airport, as is the case for conventional passport control. Preferably, the two locations are sufficiently spaced apart that persons walking from the first location to the second location take at least a predetermined minimum time to do so. This is gauged to provide sufficient time for the relevant data to be retrieved and supplied to the second location. In practice, this is preferably less than 60 seconds and, more preferably, less than 30 seconds.

However the system could also be implemented with the first and second locations significantly more remote from one another. For example, the first location could be at a departure gate in one airport where the unique identifiers carried by passengers boarding an aircraft are detected. The second location could be at the destination airport.

The retrieved data could be supplied directly (i.e. in its raw form) to the second location in the form of an alert, message or other transmission, such as an email. However, preferably the method comprises adding the retrieved information to a transient database relating to those person(s) for whom unique identifiers have been detected, wherein the retrieved information is supplied to the second location by accessing the transient database. In this way the information can be viewed quickly, since it is already complied and stored locally, whilst minimising data storage requirements of the second location itself, and freeing up communications bandwidth. The arrival of the detectable unique identifier at the second location could be used to trigger the retrieval of this data from the transient database so that operator input is kept to a minimum.

Any suitable databases could be accessed by the system in order to obtain the necessary information regarding each passenger. One or more "local" databases (i.e. integral to the immigration system) could be queried in addition to the external database(s). Preferably, the external database(s) include one or more of: an IPS (Identity and Passport Service) database containing personal information for passport holders (for example, UK passport holders), a lost and stolen database containing details of lost and stolen unique identifiers, a national stop list database containing details of certain persons and corresponding unique identifiers of interest and advance passenger information databases containing details of persons expected to seek access to the region.

In many cases, at least one of the external database(s) will contain biographical data relating to at least some of the persons, such as a person's name, address, place of birth, date of birth, age, etc.

In a particularly preferred embodiment, one or more of the external database(s) contain biometric data relating to at least some of the persons. Advantageously, the biometric data comprises one or more of fingerprint data, iris data and face recognition data, wherein the face recognition data preferably comprises a photograph of the person. Biometric data is particularly useful since it enables a comparison of the passport holder and the owner, according to the database, to be carried out by machine which can be both faster and more accurate than a comparable assessment by a human operator.

Hence, preferably, if one or more of the external database(s) contain biometric data corresponding to the detected unique identifier, the corresponding biometric data is included in the retrieved information supplied to the second location.

In some embodiments it may be desirable to obtain all the information corresponding to the unique identifier from all available databases simultaneously and make all of it available to the second location. However, in many cases it is preferable to keep the amount of information being transferred to a minimum, in order to reduce bandwidth of communications and reduce the storage required for either the transient database or at the second location. It is therefore advantageous that the step of using the detected unique identifier to retrieve information concerning the person from one or more external databases should comprise:

querying at least some of the external database(s) to retrieve first information relating to the person;

making a decision, based on the first information, as to whether the person should be allowed to enter the controlled region; and if so, querying at least some of the external database(s) to retrieve second information relating to the person;

wherein both the first and second information are supplied to the second location. In this way, the second information need only be retrieved if the first information supports the person's entry to the controlled region.

Preferably, the second information comprises biometric data. Typically this will only be used if the first information retrieved suggests that the person should be allowed entry to the region, since any other result will require the holder to be assisted by a border control officer, hence not making use of automated biometric checking systems.

Each of the passengers could be directed to the same second location (or multiple desks making up one second location) at which the nature of the retrieved information is used to determine what extent of checking is now necessary to permit the holder access to the controlled region. For example, a biometric checking apparatus and an officer could be provided at the second location so that either is available to perform the check and make the decision. However, this still requires passengers to be dealt with in series and could lead to queuing behind persons whose retrieved data has brought up problems. As such it is preferable to deal with different "types" of passenger in parallel. Advantageously, therefore, once the information has been retrieved, the method further comprises selecting one or more of multiple second locations based on the retrieved information, and directing the carrier of the unique identifier to the selected second location(s).

Depending on the information retrieved, the holder of each identifier can be directed to different means for performing the final decision step: for example, if the holder's profile reveals problems, they can be directed to a boarder control officer for assistance, whereas if no problems are identified from the database(s), the holder may be directed to a faster, automated route, such as a biometric checking point. This improves throughput further.

As indicated above, the manner in which the decision at the second location is made depends on the retrieved information. However, generally it is preferable that the step of using the retrieved information to make a decision as to whether to allow the person carrying the unique identifier access to the controlled region, comprises determining whether the retrieved information indicates that the person corresponding to the unique identifier should be allowed access to the region, and if so performing a check as to whether the person carrying the unique identifier is the person corresponding to the unique identifier in the external database(s).

In one preferred embodiment, performing the check comprises comparing an identification document carried by the person carrying the unique identifier with that person, the identification document preferably incorporating the unique identifier. For example, this may take the form of a passport.

In another preferred embodiment, if the retrieved information includes biometric data, performing the check comprises comparing the person carrying the unique identifier with at least some of the retrieved biometric data corresponding to the unique identifier in the external database(s), preferably performing one or more of fingerprint analysis, iris analysis or face recognition. Advantageously, the check is performed by a biometric checking system according to the second aspect of the invention.

However, advantageously, several or all of these checking techniques are made available and the appropriate one selected for each person depending on the retrieved information.

In a particularly preferred embodiment, each unique identifier is provided by a security document according to the first aspect of the invention, preferably in the form of the second RFID tag. However in other examples, the unique identifier could be provided separately to any identification document, for example in a card issued at check-in, a frequent flyer card or even a label. The use of a long range (UHF) RFID tag is particularly suitable for providing the unique identifier since, as discussed above, it can be read from relatively long distances without inconveniencing the holder, and in particular, without needing to stop them. Still, the privacy of each owner is not compromised since their personal data can only be accessed by personnel with access to the database(s).

The use of such documents offers the possibility of incorporating a document authentication step into the immigration method. Therefore, preferably the step of using the retrieved information to make a decision as to whether to allow the person carrying the unique identifier access to the controlled region further comprises determining whether the security document is authentic by interrogating the first RFID tag and checking that the identification code contained therein corresponds to (i.e. matches or is correctly related to) the unique identifier (which may be the identification code of the second RFID tag). This provides an automated authentication check and can be used in place of or alongside other methods such as a visual check of security elements on the document such as holograms, optically variable inks, UV and IR features, etc.

The third aspect of the invention further provides a system for controlling access to a region, comprising a detector adapted to detect a unique identifier carried by a person in a first location, the unique identifier corresponding to a person;

a controller adapted to receive the detected unique identifier from the detector, retrieve information concerning the person to whom the detected unique identifier corresponds from one or more external databases, and supply the retrieved information to a second location remote from the first location; and at least one terminal, at the second location, adapted to enable a decision to be made based on the retrieved information as to whether to allow the person carrying the unique identifier access to the controlled region.

Preferably, the detector comprises a radio-frequency antenna adapted to read RFID tags to thereby detect unique identifiers stored therein, preferably UHF RFID tags.

Advantageously, the system further comprises a transient database, wherein the controller is adapted to store the retrieved information in the transient database and the at least one terminal at the second location is adapted to access the transient database.

Preferably the at least one terminal comprises a computer and a monitor for displaying at least some of the retrieved information, or a biometric checking module.

In a particularly preferred embodiment, the at least one terminal comprises a second detector adapted to detect a unique identifier carried by a person in the second location, the at least one terminal being adapted to identify the retrieved information corresponding to the unique identifier detected by the second detector.

Advantageously, the system comprises a plurality of terminals at the second location, and further comprises direction means adapted to direct each person to a selected one or a selected subset of the plurality of terminals, based on the retrieved information corresponding to the unique identifier carried by the person.

Preferably, the direction means comprises a third detector adapted to detect a unique identifier carried by a person adjacent the direction means, the direction means being adapted to identify the retrieved information corresponding to the unique identifier detected by the third detector. Advantageously, the direction means further comprises an output module adapted to direct each person by indicating the selected one or the selected subset of the plurality of terminals.

Examples of security documents, systems and methods in accordance with the invention will now be described with reference to the accompanying drawings, in which:—

The following description will focus on the use of security documents, systems and methods in immigration scenarios, i.e. controlling access to a country, such as might be implemented at an airport, seaport or other transport hub. However it will be appreciated that the invention is equally applicable to controlling access to any other type of region to which it is desired to prevent access by certain persons, or conversely, to allow access only by certain persons. Other examples include offices, manufacturing plants, school and university campuses, entertainment venues, etc.

Figure 1:
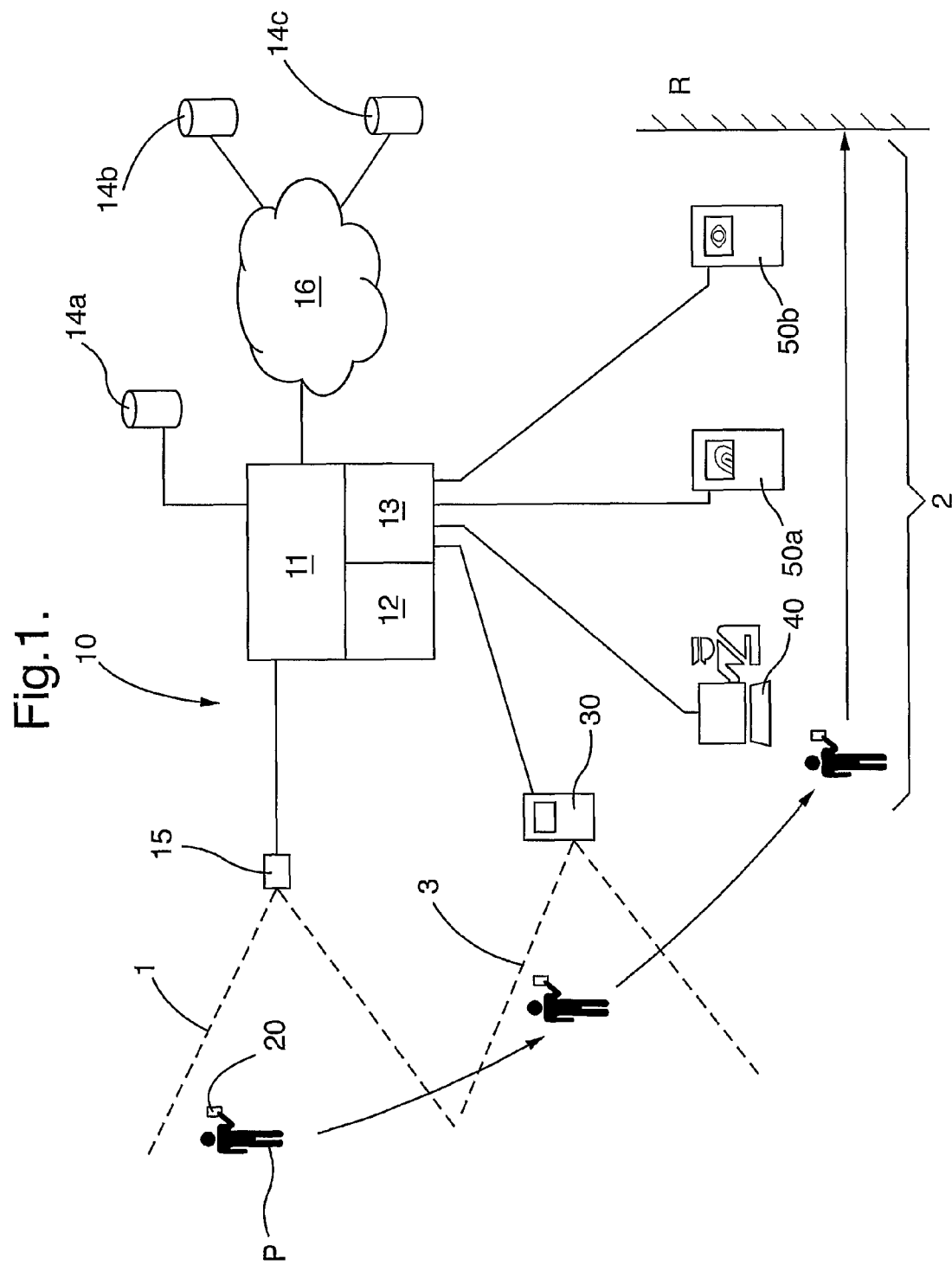
FIG. 1 shows schematically a system for controlling entry to a region.

FIG. 1 shows persons P approaching a controlled region R. Each person P carries a unique identifier which can detected by an immigration system 10. The immigration system 10 includes a controller 11 which is configured to receive signals from a detector 15 arranged to cover a first location 1. As described in more detail below, the detector 15 is able to detect unique identifiers carried by persons P in the first location 1, and to provide the detected unique identifiers to the controller 11.

The controller 11 is in communication with one or more external databases 14a, 14b and 14c. In practice, the external databases could be accessed via a network connection (14a), or via any known data exchange means including the internet, an intranet, a public switched telephone network, or a wireless network, all represented by item 16 in FIG. 1.

Any external database containing information relevant to whether or not persons should be permitted access to the controlled region may be accessed by the controller 11. By "external database" it is meant databases which are maintained largely independently of the immigration system itself, for example by governmental or security bodies, or by separate immigration systems (i.e. those at other airports and the like).

In the case of immigration systems, the controller 11 may access databases such as the IPS database (containing details of all UK passport holders, and maintained by the UK Government), Interpol's Lost and Stolen database, one or more national stop lists, the UK's Suspect Index List and, in the USA, the State Department's TIPOFF database. Databases containing information supplied by other immigration systems may also be accessed. In at least one, possibly each database, the information is associated to the unique identifier belonging to the person concerned.

The controller 11 is adapted to retrieve information from one or more of the databases 14 based on unique identifiers detected by detector 15. In practice this may involve using each detected unique identifier to query each selected database. Alternatively, one database (typically the IPS database or its equivalent outside the UK) may be interrogated first in order to identify the person corresponding to the unique identifier. The retrieved information (such as the person's name, for example) can then be used to carry out predefined searches via one or more other databases. The results of these searches can then be returned to the IPS database such that a decision can be made on whether to grant access to the person. Optionally, additional data may be retrieved from local (internal) databases 12, such as records kept by the immigration system 10 itself.

Once collated, the retrieved data is made available to at least one second location 2. The second location 2 is arranged some way from the first location 1, along the path which is followed by the persons P toward the controlled region R. In a typical immigration system, for example, the first location might be situated at an arrivals gate in an airport, and the second location might be at a passport control area positioned just before baggage reclaim. The second location is typically provided with one or more terminals arranged to utilize the retrieved information. In the system of FIG. 1, three such terminals 40, 50a and 50b are depicted in the second location 2. The first terminal 40 comprises a computer such as a PC with a monitor for use by a border officer. The second and third terminals 50a and 50b comprise biometric checking apparatus, described below. All are used to make a decision as to whether or not a person P should be permitted entry to the controlled region R, based on the information that has been retrieved.

The retrieved information may be supplied to the second location in a number of ways. In one example, the information could be passed to one or more (or all) of the terminals in the form of a message, such as an email, or some other string of data. If it can be deduced which of the terminals the check will be performed by, the message may only be sent to that terminal (or subset of terminals). Alternatively the sending may be non-specific. However in a preferred embodiment the retrieved information is stored by the controller 11 in a local transient database 13. Here, "transient" simply means that the content of the database relates to the persons for whom unique identifiers have been detected—i.e. persons who have arrived at the immigration system—as opposed to databases of information relating to people in general. Typically, a record is established for each detected unique identifier and any corresponding retrieved information is associated with it. Depending on the nature and volume of the information retrieved, it may not be necessary or desirable to include all of the data in the record. The record may also include the outcome of decisions made by the controller 11 based on the retrieved information, e.g. "STOP" if one or more of the databases brings up a problem, or "OK" if no problems are revealed.

Each terminal 40, 50a and 50b can then access the transient database 13 to retrieve the appropriate data record as each person P approaches the second location 2. This may be performed manually (e.g. upon input of the person's name), but preferably the terminal includes a detector which senses the unique identifier carried by a person approaching the terminal, and a processor which queries the transient database 13 to retrieve the relevant data.

A decision can then be made at the second location 2 as to whether the person carrying the unique identifier should be permitted access to the controlled region R. This could be based solely on the retrieved information: for example if an "OK" decision is retrieved, the person may be admitted directly into the controlled region. However, to improve security, the decision preferably includes performing a check that the person carrying the unique identifier is the person to whom the unique identifier corresponds on the databases. The manner in which this may be performed depends on what information has been retrieved, as described in more detail below. A further improvement is to include a check of the unique identifier's authenticity.

Figure 2:
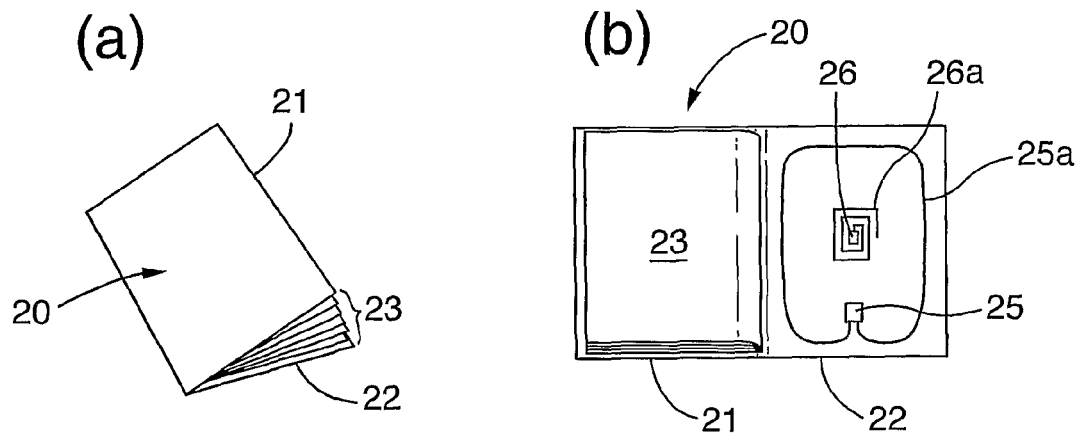
FIG. 2 shows a security document which may be used in the system of FIG. 1.

The unique identifier may be carried by each person P in a number of ways. It is preferable that the unique identifier should be detectable remotely without needing to stop the person. RFID tags are a particularly preferred method of implementing this, although other techniques are possible, including the use of bar codes or 2D bar codes. Ultra High Frequency (UHF) RFID tags are believed to be particularly suitable given the long range over which they can be interrogated by a reader. Such tags could be incorporated into a document such as a card handed to the passenger at check-in, or into a frequent flyer pass, for instance. Alternatively labels containing RFID tags could be adhered to boarding passes. An example of a particularly preferred security document 20 containing a unique identifier is shown in FIG. 2, which can be used in the system of FIG. 1 (and finds further applications elsewhere), and is described in more detail below.

In some embodiments, each person P may move directly from the first location to the second location and, if there is more than one terminal, select one of their choosing or be directed according to criteria such as their nationality, country of departure etc. This is particularly appropriate if the system is implemented such that all of the persons P are subject to the same form of checking regardless of the nature of the retrieved information, for example if it is desired for a border control officer to perform each check using the retrieved information (such as at terminal 40 in FIG. 1). However, as previously noted it is advantageous to provide more than one method of performing the check, depending on the type of information that has been retrieved. For example, if biometric data has been received, the check can be performed by a biometric checking apparatus such as terminal 50a or 50b, and if not a check by an officer may still be required. In addition, each terminal 40, 50a and 50b may itself be capable of performing different types of check: for example, a biometric checking apparatus 50a, 50b may be usable by an authorized officer to access the retrieved data in the same way as a computer 40, or hardware required to perform biometric checking may be incorporated into a computer terminal 40.

Hence the persons P may simply arrive at any terminal in the second location and an appropriate check be carried out to decide whether that person P should be permitted access to the controlled region R. However, since some forms of checking take more time than others, this can lead to unnecessary queuing. Hence in a particularly preferred embodiment, the system 10 further comprises a direction device 30 positioned along the path between the first location 1 and the second location 2 at a third location 3. The direction device 30 directs each person P to one of the terminals 40, 50a or 50b (or a subset of the terminals) based on the retrieved information corresponding to that person's unique identifier. In this way, persons for whom biometric data (for example) has been retrieved can be directed to a biometric checking terminal 50a or 50b, for faster checking, whereas persons for who biometric data is not available can be directed to a border control officer at terminal 40. This reduces queuing by "fast-tracking" certain persons via faster checking procedures whilst only those whose details require further investigation (or for whom no information exists on the databases) need be handled by a border control officer.

Figure 3:
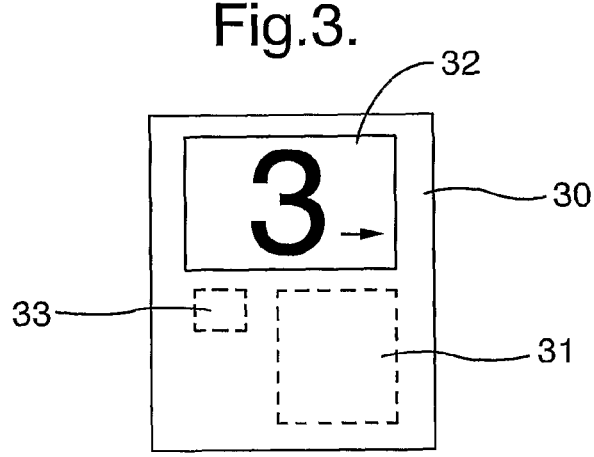
FIG. 3 shows a schematic direction device which may be used in the system of FIG. 1.

An example of a direction device 30 is shown in FIG. 3. The device 30 includes a processor 31 for communicating with the controller 11 or transient database 13, and an output means such as a visual display 30 for indicating to the person P which of the terminals 40, 50a or 50b (analogously termed multiple second locations) to report to. The device 30 may identify an approaching person P in a number of ways. Preferably, the device 30 includes a reader 33 arranged to read the person's unique identifier in a manner analogous to detector 15. For example, the reader 33 may be an RFID tag reader. The power of the reader's antenna may, however, be less than that of the detector 15 so that only the unique identifier of a person approaching the device closely (e.g. within less than 1 metre, or even touching the unique identifier against the device 30) is detected. The detected unique identifier is used by the processor 33 to access the relevant data retrieved by the controller 11 (preferably via transient database 13). Based on the retrieved data, the processor 33 decides which of the terminals (or second locations) the person corresponding to the unique identifier should be directed to, and an appropriate output is given. Alternatively, this decision could be made by controller 11 and the outcome included in the data retrieved by processor 33. The output from the direction device 30 may be audible as well as, or instead of, visual. Each person arriving from the first location can then present their unique identifier to the device 30 to be allocated a checking terminal, and proceed to the appropriate one for checking, thus minimizing queuing. Typically, many such devices 30 would be provided in the vicinity of the third location so that many persons P can be directed at once.

Figure 4:
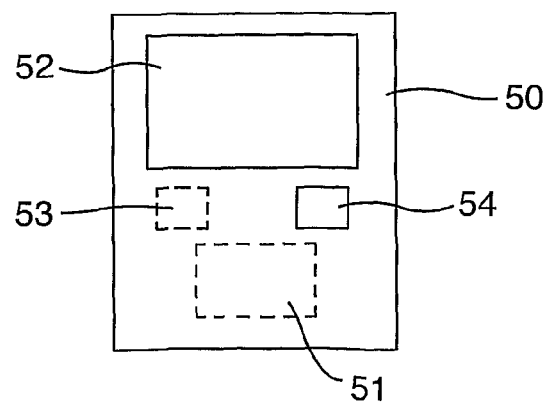
FIG. 4 shows a schematic biometric checking terminal which may be used in the system of FIG. 1.

An example of a biometric checking terminal 50a or 50b is shown in FIG. 4. Typically this will comprise a processor 51 arranged to communicate with the controller 11 and/or transient database 13, an output device such as visual display 52, and a biometric input module 54. The biometric input module 54 will include input means appropriate for the biometric measurement that is to be made. For example, the module may include a fingerprint or iris scanner, or a camera for facial recognition. More than one different type of input means may be included in the terminal so that, for example, any one terminal may be able to perform both iris scanning and fingerprint matching. Also incorporated is means for detecting a person's unique identifier, such as detector 53. As in the case of the direction device 30, the detector 53 may be of any sort appropriate to the nature of the unique identifiers used. In the present case, this may be an UHF RFID reader and its power may be adjusted to detecte only unique identifiers in close proximity to the terminal 50. The detected unique identifier is used by the processor 51 to retrieve the corresponding data that has been collated by the controller 11, typically by accessing transient database 13. Generally, only persons for whom biometric data is included in the retrieved information will be directed to a biometric checking module 50, so the processor 51 is then able to carry out a 1:1 comparison between the input it receives from the biometric checking module 54 (such as the holder's fingerprint or iris scan) and the corresponding data held in their data record. This allows a much faster 1:1 match, rather than having to do a more complicated and slower 1 to N (many) search through all the available biometric data for persons generally. Hence both throughput and security are increased. The possibility of a one to one comparison also improves the reliability of performing facial recognition.

Figure 5:
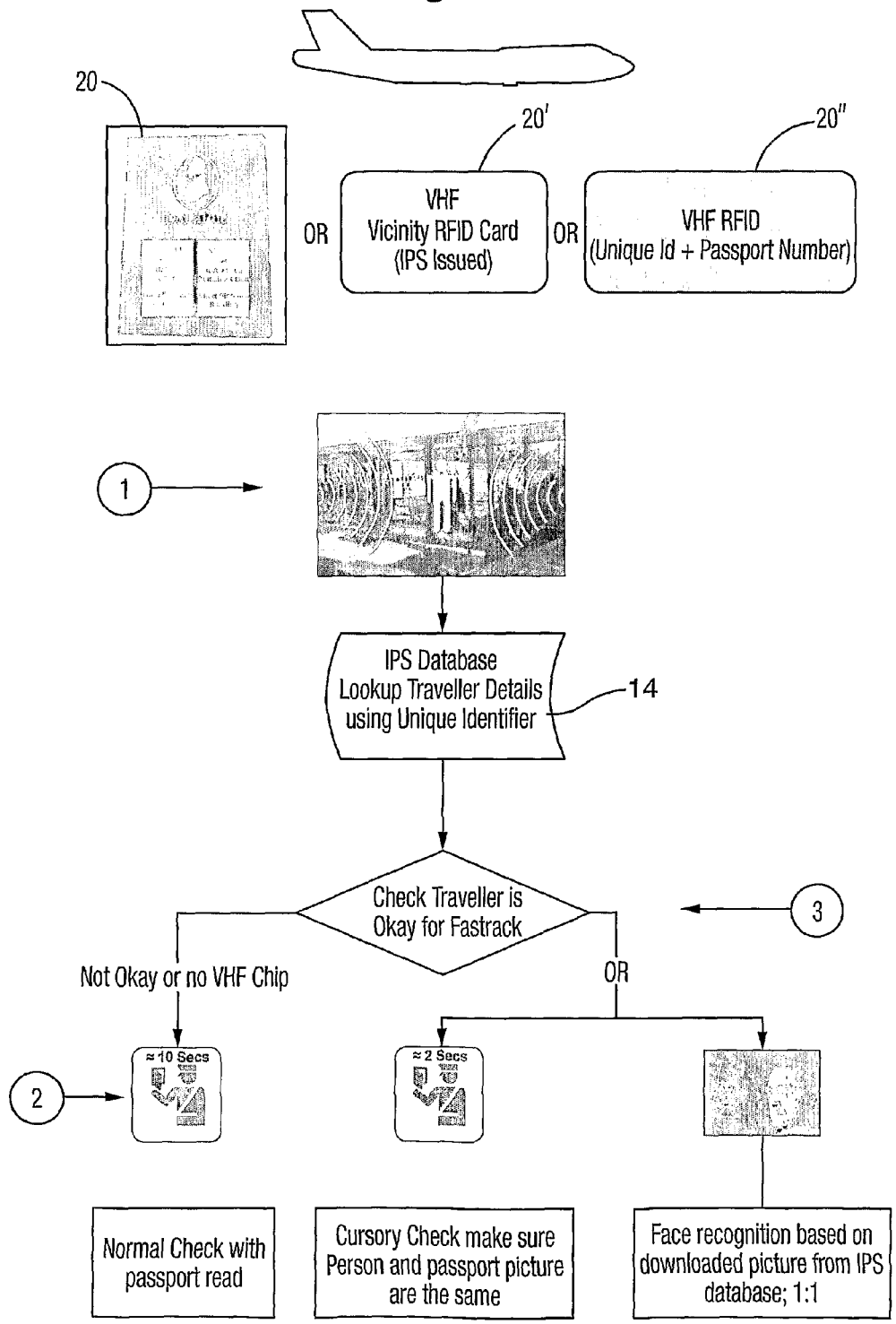
FIG. 5 is a flow diagram depicting a method of controlling entry to a region.
Figure 6:
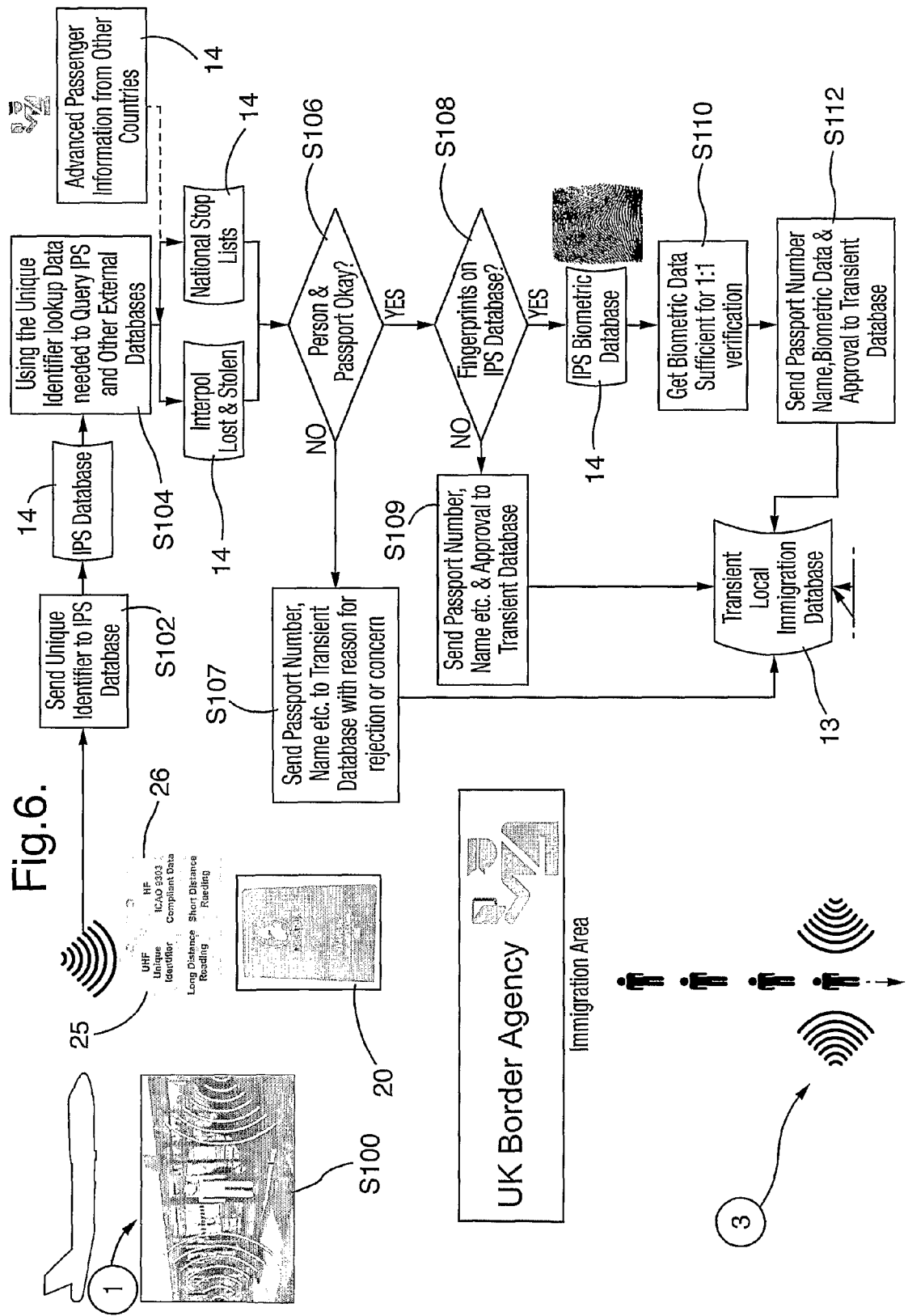
FIG. 6 is a flow diagram illustrating the steps of FIG. 5 in more detail.
Figure 6:
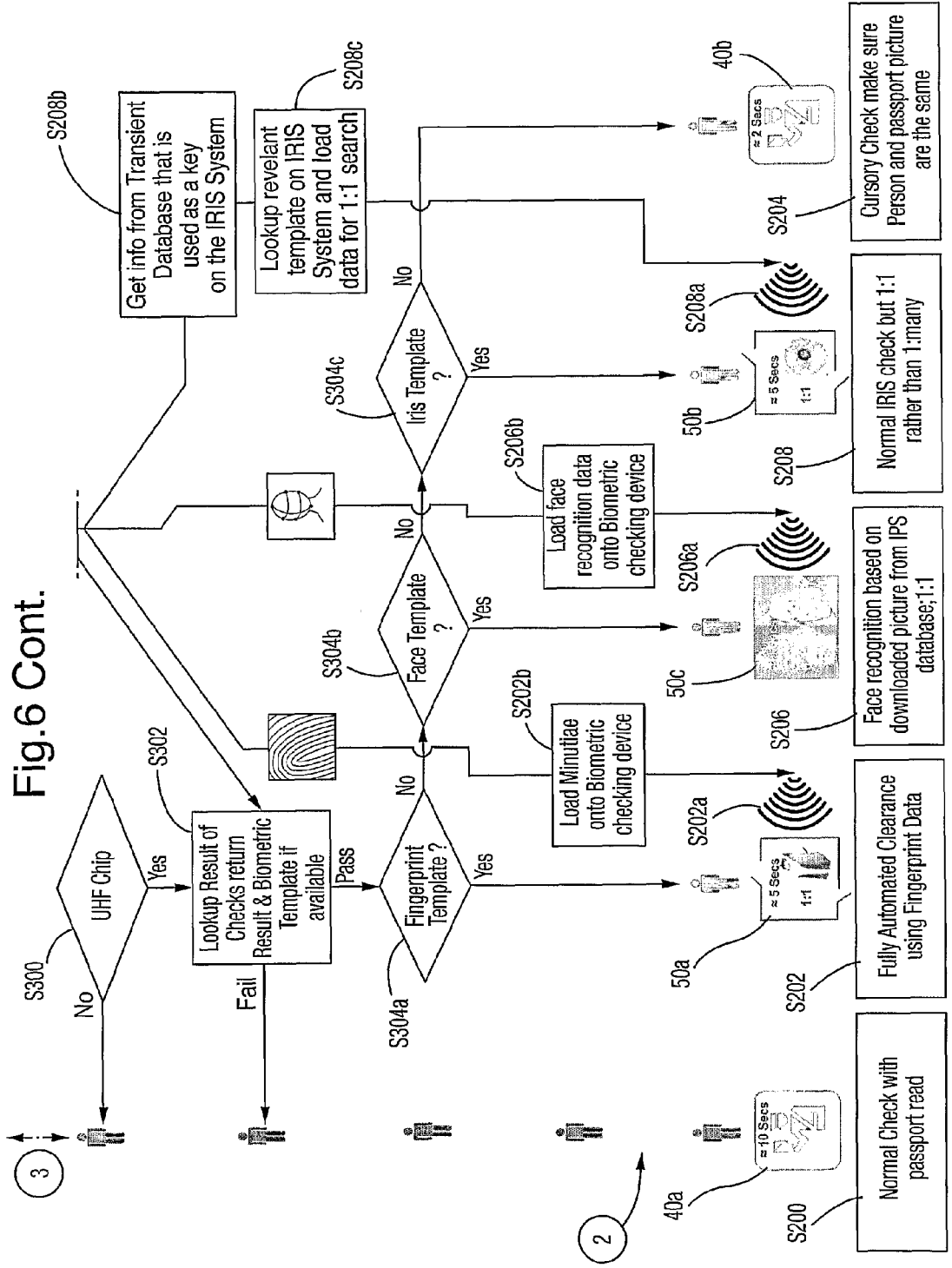

FIGS. 5 and 6 are flow diagrams depicting the steps involved in an exemplary immigration process. FIG. 5 shows an overview. Each person P carries a unique identifier incorporated in a passport type document 20, a card 20' which may be issued by the IPS or a frequent flyer card 20" which may for example also include the person's passport number. Any other suitable way of carrying the unique identifier could be used as desired. In the example, the unique identifier is a code contained in a RFID tag, preferably a UHF RFID tag which can be read over a relatively long distance. At the first location 1, for instance when exiting the aircraft, in the gangway between the aircraft and the gate area, a detector such as a UHF chip reader scans the person's passport 20 from a distance of several feet and the unique identifier of the UHF chip read. As the UHF chip has no personal data on it there would be no security issues with this.

The unique identifier would then be used to access data as previously described from external database(s) 14 such as the main government passport database (e.g. the UK's IPS database) in which the data would have been previously saved during the passport issuing process. In the time it takes the person to get from the first location to the second location 2, such as an immigration desk, using the data looked up from the government passport database 14, several additional searches of other external databases (Interpol etc.), can also be carried out. Any data collected would then be held locally in a transient database and be available to an immigration officer well before the traveler reached the immigration desk. The additional time allows greater and more in-depth security checks and also quicker clearance of nationals of the country concerned as the immigration official would have all relevant information available prior to the traveler arriving at the immigration desk.

In preferred embodiments, there is also the option of having a fast lane immigration clearance. By scanning the UHF chip on approach to immigration at an intermediate third location 3, persons who had been pre-cleared by the system as not requiring a detailed passport inspection could be diverted through a separate channel where only a cursory check by immigration officials would be required (e.g. a visual inspection of the document). Those with passports without the UHF chip in their passports, or that had been flagged up by the system as having some problem in the pre-clearance procedure, would go through the normal more vigorous immigration procedure. Essentially this amounts to a pre-immigration clearance which could significantly reduce time taken by nationals to be cleared through immigration but increase security.

FIG. 6 shows this process in more detail. In step S100, a person's unique identifier is detected in the first location 1. In steps S102 and S104, the controller 11 receives the detected unique identifier and uses it to look up data from a number of external databases 14. In step S106, the controller decides whether or not any problems have been identified in the data retrieved. If so, in step S107, some or all of the retrieved data is stored in the transient database 13, preferably highlighting the reason for rejection or concern. If not, in step S108 the controller identifies whether the retrieved data includes biometric data or indicates that biometric data is available. If not, in step S109 some or all of the retrieved data is stored in the transient database 13, preferably with an indication that the person is approved. If biometric data is available, in step S110 this is retrieved (if not already retrieved in step S104), and in step S112 the retrieved data (including biometric data) is stored in the transient database 13, preferably with an approval indication.

In this example, persons P approaching the second location 2 are directed to one of a number of terminals 40a, 40b, 50a, 50b and 50c depending on the retrieved data. This is carried out at a third location 3 by means such as device 30 described above. In step S300 an attempt is made to detect a unique identifier carried by a person in the third location 3. If a unique identifier is not detected, the person is directed to a standard checking terminal 40a manned by an officer, since no additional information is available to the system. If a unique identifier is detected, in step S302 the detected identifier is used to look-up the corresponding retrieved information in the transient database 13. If problems have been identified, the record is considered a "fail" and the person is directed to a standard checking terminal 40a. If no problems are detected in the data, in step S304 it is determined whether any biometric data is available (either forming part of the retrieved data or otherwise available to the system, e.g. via use of a data key for retrieving biometric information from another database). In this example, this involves a series of up to three checks to determine whether a fingerprint template, a face template or an iris template is available for the person. However, these steps could be performed in any order and are not limited to those shown in this example. In the first check S304a, it is determined whether a fingerprint template is available. If so, the person may be directed to a fingerprint biometric checking terminal 50a. If not, in step S304b it is determined whether a face template is available. If so, the person may be directed to a face recognition biometric checking terminal 50c. If not, in step S304c it is determined whether an iris template is available. If so, the person may be directed to a iris biometric checking terminal 50b. If not, meaning that in this example no biometric data is available, the person is directed to another standard checking terminal 40b where a cursory inspection can be carried out to check that the passport picture shows the passport holder.

Once the person P reaches the designated terminal at the second location 2, an appropriate check is performed. This typically involves checking that the person carrying the unique identifier is the same person to whom the identifier is allocated on the databases. However, in systems requiring a lesser level of security this may not be required and the decision could simply be made on the retrieved data alone.

In the present example, if a person is directed to a standard checking terminal manned by an officer such as 40a or 40b, the level of checking by the officer required will depend on what data is retrieved and whether there are any identified problems. Persons arriving at desk 40a are those with either no data record or problems indicated. As such their passport documentation will require thorough examination in step 200, taking a minimum of around 10 seconds per person. Persons arriving at desk 40b have "approved" data records and in this case all that is required is a cursory check to ensure the holder matches the passport photo, in step S204, typically taking around 2 seconds per person.

Persons arriving at biometric checking terminal 50a undergo an automated procedure to check their fingerprint(s) against their records in step S202. Upon approach to the terminal 50a, their unique identifier is detected (step S202a) and the required biometric data retrieved from the transient database 13 (step S202b). A 1:1 comparison can then be performed. The process is similar at biometric checking terminal 50*b* where an iris scan is used for comparison with records in step S208. Typically, iris records are kept in a separate database and once the person's unique identifier is detected (step S208*a*) this is used to access the transient database 13 to retrieve data including a key (step S208*b*) which can then be used to look-up the biometric data on an iris database (step S208*c*). A 1:1 comparison can then be performed. At face recognition terminal 50*c*, an image of the passport holder is taken and compared with retrieved face recognition data in step S206. Again, the unique identifier carried by the passport holder is detected (step S206*a*) and used to retrieve the corresponding face recognition data (step S206*b*), which can then be used to perform a 1:1 comparison.

It should be noted that the first, second and (optionally) third locations could be configured in many different ways depending on the application in question. One of the issues in traveling is to ensure that the correct person boards the correct aircraft, and whilst there are a number of suggestions on how this could be improved by using biometrics, in an embodiment of the present invention, a person's unique identifier (e.g. in a UHF RFID passport) could be read when checking in (first location) and read again at the boarding gate (second location). In this case the external database could contain lists of the expected passengers and the final decision as to whether to permit boarding would simply entail checking that each detected unique identifier corresponds. Using a UHF RFID chip would make this straightforward to implement and have no data protection issues. Indeed potentially this enables the retro-fitting of existing passports with UHF functionality, since the airline could affix a secure UHF RFID label during check-in and pass the data back to the government issuing systems and other external databases.

Another aspect to the security of a security system such as that described above is the authenticity of the unique identifiers themselves. As mentioned previously these will typically be incorporated into documents such as passports. A particularly advantageous security document suitable for use in the above described immigration system (and other systems where document authenticity is important) will now be described.

An example of such a document 20 is shown in FIG. 2. The idea is to combine both HF RFID (Short Range-ePassport Style) and UHF RFID (Long Range) chips and associated antennae into a single security document such as a passport or ID card.

High Frequency (HF) RFID tags operate in the frequency range 3 MHz to 28 MHz, more preferably 13 MHz to 14 MHz and most preferably 13.56 MHz. Depending on the chip design (especially the size of the aerial) and reader power, the distance within which reading of the data on the chip is possible is at most around 3 meters. Typically around 1 metre is considered an acceptable maximum. In some cases it may be desirable to restrict this still further, to a few centimetres or even direct contact with the reader.

Ultra High Frequency (UHF) RFID tags operate in the frequency range 433 to 950 MHz and most preferably 860 to 870 MHz. UHF tags offer higher reading distances of up to around 10 metres (but more typically around 3 metres, again depending on chip design), and high reading speeds.

In this example, the document 20 is a booklet style document with a front cover 21, back cover 22 and inside pages 23. The first and second RFID tags may typically be incorporated into or onto one or both of the covers. For example, in FIG. 2, a short range (HF) RFID tag 25 and a long range (UHF) RFID tag 26 are both arranged on the back cover 22 of the booklet, together with respective aerials 25*a* and 26*a*. In other cases, one tag may be in the front cover and the other in the back cover.

The combination of an HF tag 25 and a UHF tag 26 provides the document 20 additional functionality and security. For instance the ePassport (HF) chip 25 may contain the details of the UHF Chip 26 (and/or vice versa), so the inclusion of an UHF chip in the front cover of an ePassport could provide proof that the inlay had not been substituted in the passport.

UHF chips such as tag 26 are capable of holding only a very small amount of data (usually only holds a single code such as a unique identifier), unlike the ePassport HF chip 25 which can hold several ten of thousands of bytes of data. UHF tags are also better suited to reading at longer distances and therefore can be more convenient and less intrusive to the holder when being read. As there is no data held in the UHF chip there are no significant civil liberties/privacy issues unlike with ePassport chips. UHF chips are also relatively inexpensive when compared with the HF ePassport type chips, typically costing only a few US cents each. Generally the two technologies can be used in proximity to each other whilst still retaining functionality of both technologies.

The combination of the two technologies into a single document 20 offers a number of advantages.

Typically, an HF ePassport chip 25 has an area in it designated as "Datagroup 13" which can contain data that is not required as part of the ICAO (International Civil Aviation Organization) specification. In one embodiment of the present invention, this area could contain an identification code in the form of details of the UHF Chip, or the UHF chip could be programmed with an identification code in the form of the same number as the Unique Chip Identifier contained in the HF chip or the data programmed into Datagroup 13. If this methodology was used then removal or substitution of either chip would be easily detectable and provide the passport with a higher level of security.

The identification codes in the two RFID tags need not be identical but could instead be related to one another, e.g. via a database or a suitable algorithm.

The provision of a UHF chip also provides a number of additional benefits. In particular, controlling and accounting for passports during production is a difficult and costly process due to the many stages of production and the resulting make-ups that are often required. Having a UHF chip in the passport would make this process far simpler and more reliable by making it possible to track each document though the process ("Trackable and Traceable"), therefore improving efficiency and saving costs. The use of a UHF chip enables the passport to be tracked and traced more easily because the chip can be read at long range, so the passports can be monitored when produced in the factory, when packed into boxes, during transit to the site where the passports will be personalized, during the passport personalisation process and during dispatch to the passport applicant. Within the factory itself, the passport can be tracked and identified from one station to the next. One particular difficulty conventionally encountered in the passport manufacturing process is that, to identify each passport, it is necessary for the operator to open the booklet and examine information inside (such as the passport number, or passport owner's name), which is cumbersome and slows down production. The use of a UHF chip overcomes this problem since the passport can be automatically identified by a suitable reader when it arrives within the range of that reader. There is no longer any requirement for the operator to study the booklet and no opportunity for user error. With ePassports (i.e. passports also containing an HR RFID chip storing personal data) this would be even more important due to their far higher value compared to conventional passports. Whilst the provision of both the HR RFID chip and the UHF RFID chip as permanent features of the passport is preferred, a conventional ePassport, or indeed a standard passport with no RFID chip, can be made "Trackable and Traceable" by the provision of a UHF RFID chip which is temporally attached to the passport during manufacture and/or personalization, and which can be removed at a later stage, if desired. For example, the UHF chip could be contained in a label which is adhered to the passport and later detached.

In cases where the UHF and HF functionality is to be a permanent feature of the passport, the two devices could be combined onto a single chip, which would reduce the overall cost of implementing both technologies in a single document whilst at the same time giving the passport additional functionality. This would provide the additional level of authentication described above as well as effectively becoming "Trackable & Traceable".

For all of these reasons it is advantageous to use the security document 20 in the immigration system described above for carrying the unique identifiers. The UHF RFID chip 26 is ideally suited to contain a unique identifier code which can be detected by a suitable UHF RFID reader. Further, the checking carried out at the second location can include a check of the document's authenticity by reading data from both the UHF chip 26 and the HF chip 25 and carrying out a comparison. For example, if both chips 25 and 26 are programmed to include the same unique identifier, a comparison of the codes on each will confirm whether one or the other has been substituted. Similarly, where the tags 25 and 26 are each provided with related codes, a check can be made using the appropriate database or algorithm to determine whether the relationship between them is correct, in order to detect any chip substitution.

The terminal(s) provided at the second location 2 may therefore include an authentication apparatus comprising suitable reader(s) for interrogating the first RFID tag as well as the second RFID tag, and processing means for performing a comparison between the data retrieved from each. A single RFID reader may be sufficient where it can be configured to read both types of RFID tag (e.g. operable at both frequencies required). Alternatively two dedicated readers may be supplied. The authentication apparatus may be integrated with the biometric checking terminals 50a, 50b, 50c and standard checking terminals 40a, 40b, or could be provided separately.

The invention claimed is:

1. A method of controlling access to a region, each person seeking access carrying a detectable unique identifier, the method comprising:
   detecting, at a first location through which all persons seeking access to the region are allowed to pass, a unique identifier relating to a person in the first location;
   using the detected unique identifier to retrieve information concerning the person from one or more external databases;
   supplying the retrieved information to a second location remote from the first location in response to detecting the unique identifier at the first location; and
   using, at the second location and when the person is at the second location, the retrieved information to make a decision as to whether to allow the person carrying the unique identifier access to the controlled region.

2. A method according to claim 1, further comprising:
   detecting the unique identifier carried by the person in the second location and using the detected unique identifier to identify the retrieved information concerning the person supplied to the second location.

3. A method according to claim 2, further comprising:
   adding the retrieved information to a transient database relating to those person(s) for whom unique identifiers have been detected, wherein the retrieved information is supplied to the second location by accessing the transient database.

4. A method according to claim 1, wherein
   the external database(s) include one or more of: a passport database containing details of passport holders, a lost and stolen database containing details of lost and stolen unique identifiers, a national stop list database containing details of certain persons and corresponding unique identifiers of interest and advance passenger information databases containing details of persons expected to seek access to the region.

5. A method according to claim 1, wherein
   one or more of the external database(s) contain biographical data relating to at least some of the persons.

6. A method according to claim 1, wherein
   one or more of the external database(s) contain biometric data relating to at least some of the persons.

7. A method according to claim 6 wherein
   the biometric data comprises one or more of fingerprint data, iris data and face recognition data, wherein the face recognition data comprises a photograph of the person.

8. A method according to claim 6, wherein
   if one or more of the external database(s) contain biometric data corresponding to the detected unique identifier, the corresponding biometric data is included in the retrieved information supplied to the second location.

9. A method according to claim 1, wherein
   the step of using the detected unique identifier to retrieve information concerning the person from one or more external databases comprises:
   querying at least some of the external database(s) to retrieve first information relating to the person;
   making a decision, based on the first information, as to whether the person should be allowed to enter the controlled region; and
   if so, querying at least some of the external database(s) to retrieve second information relating to the person;
   wherein both the first and second information are supplied to the second location.

10. A method according to claim 9, wherein
    one or more of the external database(s) contain biometric data relating to at least some of the persons, and
    the second information comprises biometric data.

11. A method according to claim 1, further comprising:
    once the information has been retrieved, selecting one or more of multiple second locations based on the retrieved information, and directing the carrier of the unique identifier to the selected second location(s).

12. A method according to claim 1, wherein
    the step of using the retrieved information to make a decision as to whether to allow the person carrying the unique identifier access to the controlled region, comprises determining whether the retrieved information indicates that the person corresponding to the unique identifier should be allowed access to the region, and if so performing a check as to whether the person carrying the unique identifier is the person corresponding to the unique identifier in the external database(s).

13. A method according to claim 12, wherein
    performing the check comprises comparing an identification document carried by the person carrying the unique identifier with that person, the identification document incorporating the unique identifier.

14. A method according to claim 12, wherein
if one or more of the external database(s) contain biometric data corresponding to the detected unique identifier, the corresponding biometric data is included in the retrieved information supplied to the second location, and
if the retrieved information includes biometric data, performing the check comprises comparing the person carrying the unique identifier with at least some of the retrieved biometric data corresponding to the unique identifier in the external database(s).

15. A method of controlling access to a region, each person seeking access carrying a detectable unique identifier, the method comprising:
detecting, at a first location through which all persons seeking access to the region are allowed to pass, a unique identifier relating to a person in the first location;
using the detected unique identifier to retrieve information concerning the person from one or more external databases;
supplying the retrieved information to a second location remote from the first location in response to detecting the unique identifier at the first location; and
using, at the second location and when the person is at the second location, the retrieved information to make a decision as to whether to allow the person carrying the unique identifier access to the controlled region, wherein each unique identifier is provided by a security document comprising a first RFID tag readable only within a first distance range, and a second RFID tag readable within a second distance range, the first RFID tag containing data pertaining to the owner of the security document and an identification code, and the second RFID tag containing the same or a related identification code, and wherein the second distance range is longer than the first distance range.

16. A method according to claim 15 wherein
the step of using the retrieved information to make a decision as to whether to allow the person carrying the unique identifier access to the controlled region, further comprises determining whether the security document is authentic by interrogating the first RFID tag and checking that the identification code contained therein corresponds to the unique identifier.

17. A method according to claim 14, wherein
the check is performed by a biometric checking system comprising a RFID tag reader for reading data from a security document having at least one RFID tag, each RFID tag containing an identification code identifying the security document, at least one biometric input module for testing a biometric of a holder of the security document, a database having data records containing details of each security document owner and the corresponding identification code, and a processor adapted to, upon recognition of an identification code, retrieve the corresponding data record and compare the output from the biometric testing module with biometric data in the retrieved data record to ascertain whether the holder of the security card matches the data records for the security document owner.

18. A system for controlling access to a region, comprising
a detector adapted to detect a unique identifier carried by a person in a first location through which all persons seeking access to the region are allowed to pass, the unique identifier corresponding to a person;
a controller adapted to receive the detected unique identifier from the detector, retrieve information concerning the person to whom the detected unique identifier corresponds from one or more external databases, and supply the retrieved information to a second location remote from the first location in response to the detector detecting the unique identifier at the first location; and
at least one terminal, at the second location, adapted to enable a decision to be made based on the retrieved information as to whether to allow the person carrying the unique identifier access to the controlled region, when the person is at the second location.

19. A system according to claim 18, wherein
the detector comprises a radio-frequency antenna adapted to read RFID tags to thereby detect unique identifiers stored therein.

20. A system according to claim 18, further comprising
a transient database, wherein the controller is adapted to store the retrieved information in the transient database and the at least one terminal at the second location is adapted to access the transient database.

21. A system according to claim 18, wherein
the at least one terminal comprises a computer and a monitor for displaying at least some of the retrieved information.

22. A system according to claim 18, wherein
the at least one terminal comprises a biometric checking module.

23. A system according to claim 18, wherein
the at least one terminal comprises a second detector adapted to detect a unique identifier carried by a person in the second location, the at least one terminal being adapted to identify the retrieved information corresponding to the unique identifier detected by the second detector.

24. A system for controlling access to a region, comprising
a detector adapted to detect a unique identifier within a security document carried by a person in a first location through which all persons seeking access to the region are allowed to pass, the unique identifier corresponding to the person;
a controller adapted to receive the detected unique identifier from the detector, retrieve information concerning the person to whom the detected unique identifier corresponds from one or more external databases, and supply the retrieved information to a second location remote from the first location in response to the detector detecting the unique identifier at the first location; and
at least one terminal, at the second location, adapted to enable a decision to be made based on the retrieved information as to whether to allow the person carrying the unique identifier access to the controlled region, when the person is at the second location, wherein
the at least one terminal comprises a biometric checking module, and
the at least one terminal comprises a biometric checking system, the biometric checking system comprising a RFID tag reader for reading data from the security document, the security document having at least one RFID tag, each RFID tag containing the unique identifier, at least one biometric input module for testing a biometric of the person, a database having data records containing details of each security document owner and the corresponding unique identifier, and a processor adapted to, upon recognition of the unique identifier, retrieve the corresponding data record and compare the output from the biometric testing module with biometric data in the retrieved data record to ascertain whether the person matches the data records for the security document owner.

25. A system according to claim 18, comprising a plurality of terminals at the second location, and further comprising direction means adapted to direct each person to a selected one or a selected subset of the plurality of terminals, based on the retrieved information corresponding to the unique identifier carried by the person.

26. A system according to claim 25 wherein the direction means comprises a third detector adapted to detect a unique identifier carried by a person adjacent the direction means, the direction means being adapted to identify the retrieved information corresponding to the unique identifier detected by the third detector.

27. A system according to claim 25 wherein the direction means further comprises an output module adapted to direct each person by indicating the selected one or the selected subset of the plurality of terminals.

\* \* \* \* \*